Dec. 6, 1955 K. SOMMER ET AL 2,725,691
PLATEN AND SUPPORT FOR ABRADING APPARATUS
Filed Feb. 12, 1953 2 Sheets-Sheet 2
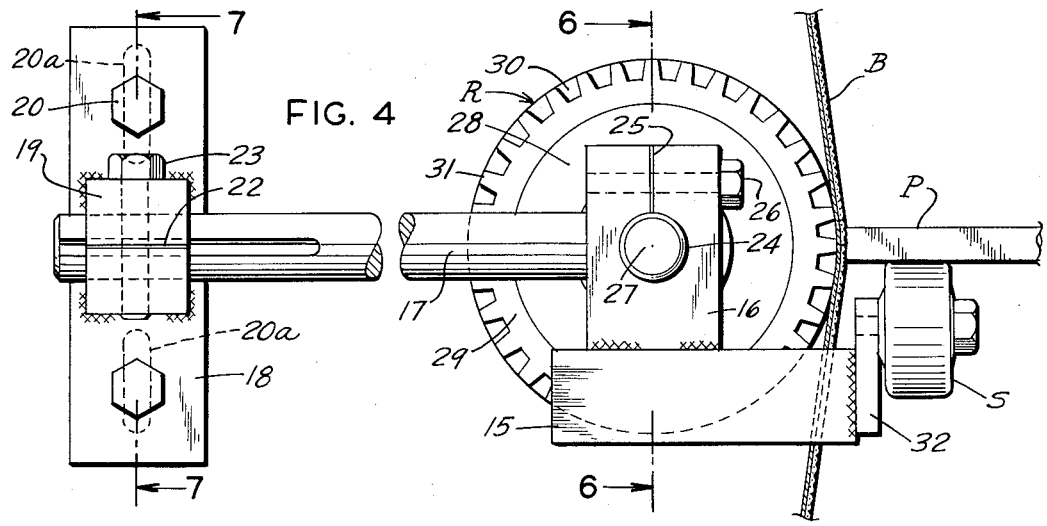
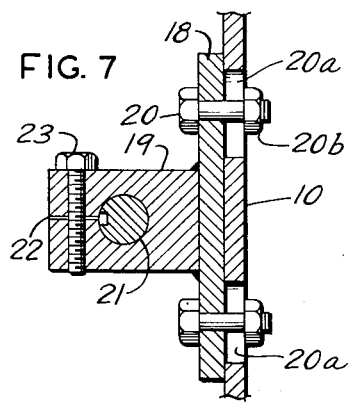
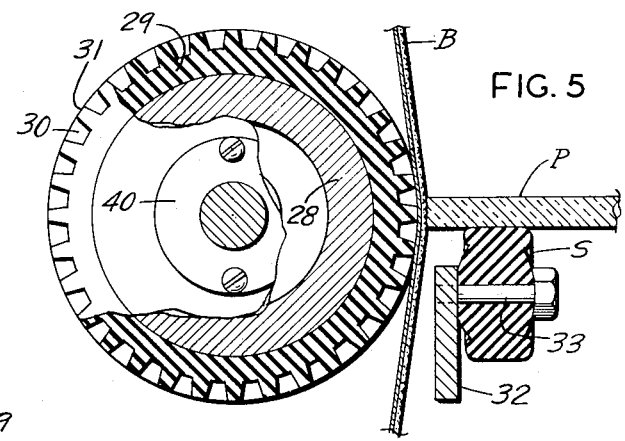
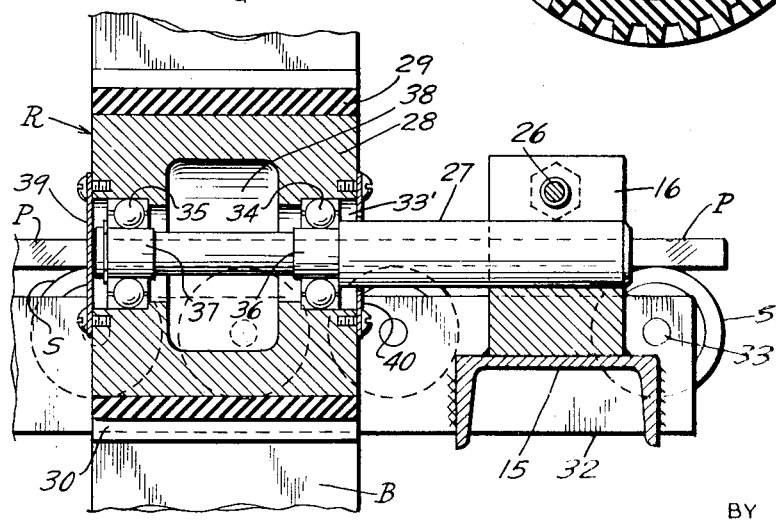
INVENTORS.
KURT SOMMER
PAUL MACA
BY
*Wallace and Cannon*
ATTORNEYS United States Patent Office 2,725,691
Patented Dec. 6, 1955

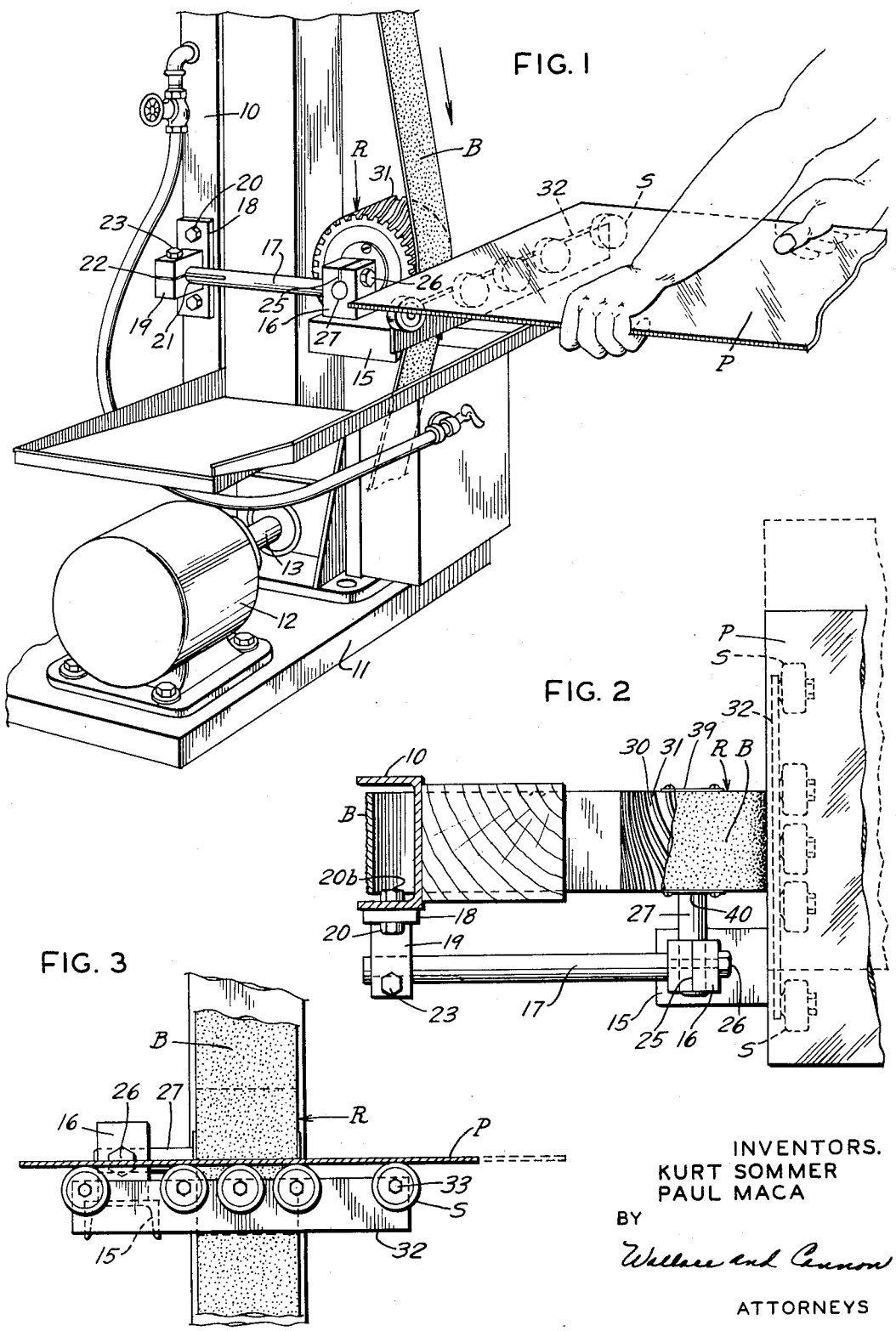

2,725,691

PLATEN AND SUPPORT FOR ABRADING APPARATUS

Kurt Sommer, La Grange Park, and Paul Maca, Hinsdale, Ill., assignors to Sommer & Maca Glass Machinery Co., Chicago, Ill., a corporation of Illinois Application February 12, 1953, Serial No. 336,564

1 Claim. (Cl. 51—135)

This invention relates to abrading apparatus and particularly to a platen and supporting arrangement for use therein and particularly one which may be advantageously employed in the glass industry to smooth the edge of plate glass.

The edges of panes of glass and the like are often abraded to smooth and polish the same and this is frequently done by bringing the edge to be smoothed into engagement with the abrasive surface on an endless abrasive belt, the belt passing over a flat platen which backs up the same where the edge of the pane of glass or the like is brought into engagement with the abrasive surface of the belt. It has been observed that when such a belt is directed over such a flat platen and the edge of a pane of glass or the like is engaged with the abrasive surface of the belt, burning of the belt and other damage thereto frequently results. It is, therefore, the primary object of our invention to afford a platen for an abrasive belt or the like which will yieldingly back up the belt and which will be arranged to move with the belt and thereby avoid burning or other damage to the belt in the course of abrading or like operations thereof.

A further object is to resort to a rotatable platen for an abrasive belt of the aforesaid character and to so arrange and locate the platen that the belt will pass about an appreciable portion of the arcuate surface of the platen in such a way as to expand the abrasive surface of the belt which, it has been observed, results in an increase in the effectiveness and useful life of the belt.

Inasmuch as it is customary to reciprocate the edge of the pane of glass or the like to be smoothed across the abrasive surface of an abrasive belt, a further object of our invention is to afford a support for a pane of glass or the like which is so located and arranged as to facilitate reciprocation of the edge of pane of glass or the like across the abrasive surface of an abrasive belt and an object ancillary to the foregoing is to afford a plurality of resilient rollers on which a pane of glass or the like may be rested when an edge thereof is to be smoothed.

A yet further object of this invention is to provide a novel platen and supporting arrangement of the aforesaid character that may be used with conventional apparatus without requiring expensive alteration of the apparatus.

Other and further objects of the present invention will be apparent from the following description and claims and are illustrated in the accompanying drawings which, by way of illustration, show a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a perspective view of a polishing apparatus with which our novel platen and supporting arrangement is associated and showing how a pane of glass is supported for reciprocation across the abrasive face of an endless abrasive belt;

Fig. 2 is a plan view of our novel platen and supporting apparatus;

Fig. 3 is a front elevational view of our novel platen and supporting arrangement;

Fig. 4 is a side view of our novel platen and supporting apparatus looking in the same direction as in Fig. 1, Fig. 4 being drawn to a larger scale than Fig. 1;

Fig. 5 is a vertical sectional view of our novel platen and supporting arrangement; and Figs. 6 and 7 are sectional detail views taken substantially on the lines 6—6 and 7—7 on Fig. 4.

One of the advantages of our novel platen and supporting arrangement is that it may be readily associated with standard apparatus and in the present instance we have shown the same in association with a standard endless belt abrading apparatus. Such apparatus includes a vertical column 10 extended upward from a base 11 which also affords a support for an electric motor 12, the shaft 13 of which carries a pulley, not shown, about which an endless abrasive belt B is directed, the belt also being directed about another pulley, not shown, provided at the top of the vertical column 10 so that when the motor is in operation the belt B travels about the aforesaid pulleys.

Our novel platen and supporting apparatus includes a supporting plate 15 that is desirably formed from channel iron as best shown in Fig. 6. The flanges of the channel iron member 15 are directed downwardly and a block 16 is welded or otherwise suitably secured to the upwardly disposed flat face of the member 15 adjacent to one end thereof. One end of a supporting bar or rod 17 is welded or otherwise secured to the block 16 to extend rearwardly therefrom.

As best shown in Figs. 1, 4 and 7, our novel platen and supporting arrangement embodies a plate 18 having a block 19 welded or otherwise suitably secured on one face thereof. As is best shown in Fig. 2, the vertical column 10 is advantageously formed from channel iron and is disposed to have the flanges thereof extended rearwardly. The plate 18 is rested against the outer face of one of the flanges of the column 10 and is suitably secured thereto as by bolts 20 passed through slots 20a in the flange of the column, nuts as 20b cooperating with the bolts to secure the plate 18 to the flange in an adjusted vertical position determined by the position of the bolts 20 along the extent of the slots 20a. The block 19 has an opening 21 formed therein and the block 19 is split, as indicated at 22, outwardly from the opening 21. A bolt 23 is freely passed through the portion of the block 19 above the split 22 and is passed into a tapped opening provided in the block 19 beneath the split 22. One end of the rod 17 is passed through the opening 21 and the bolt 23 is then tightened in position to draw together the portions of the block 19 on opposite sides of the split 22 and thereby the rod 17 is firmly connected to the block 19. As best shown in Figs. 2 and 4, the rod 17 extends beyond the opening 21 and this enables the block 16 to be located in a selected position relative to the front face of the column 10.

The block 16 has a centrally located opening 24 formed therein to extend at right angles to the rod 17. The block 16 is split upwardly away from the opening 24 as indicated at 25. A bolt 26 is freely passed through a portion of the block 16 located to the left of the split 25 as viewed in Fig. 4. A shaft or axle 27 is mounted in the opening 24 and when the bolt 26 is manipulated to draw the sections of the block 16 of opposite sides of the split 25 toward each other this is effective to clamp the shaft 27 in the block 16.

The platen of our novel arrangement is afforded by a roller R that is rotatably mounted on the shaft 27 in a manner to be explained presently. The roller R embodies a metallic core 28 about the periphery of which a ring or sleeve 29 of resilient material, such as rubber, is securely fastened. As best shown in Fig. 2 the periphery of the ring 29 has spiral grooves 30 formed therein whereby spiral ribs 31 are defined on the periphery of the roller R. The supporting rod or bar 17 is so related to the block 19 that the shaft 27 and the roller R carried thereby are disposed well forwardly of the front face of the column 10 and the forward vertical pass of the abrasive belt B is thereby directed about an appreciable portion of the surface of the roller R. As a belt passes about the periphery of the roller R the abrasive face thereof is expanded or opened which, it has been observed, improves the abrasive action of the abrasive surface of the belt B and increases the life of the belt.

When the edge of a pane of glass P or the like is to be brought into engagement with the portion of the abrasive belt B passing downwardly about the roller R, it is advantageous to firmly support the pane P adjacent to the edge thereof that is to be abraded by the abrasive face of the belt B. To this end a supporting plate 32 is welded or otherwise suitably secured to the forwardly disposed face of the support 15. The plate 32 extends from the support 15 past the roller R in spaced relation therewith and a plurality of resilient rollers as S, preferably formed of rubber or the like, are mounted to rotate about the bolts as 33, Fig. 5, mounted in the plate 22. The upper portions of the peripheries of the rollers R lie in a common plane and consequently when a pane of glass P or the like is rested thereon the edge of the plate may be freely reciprocated across the abrasive face of the belt B.

In order to insure free rotation of the roller R about the shaft 27 an axial opening 33' is afforded in the metallic core 28. Anti friction bearings as 34 and 35 are mounted in the bore 33' and bearing surfaces 36 and 37 on the shaft 27 are respectively mounted in these anti-friction bearings so as to thereby afford a substantially frictionless support for the roller R. The axial opening 33' may be enlarged medially of the core 28, as indicated at 38, and this enlargement of the opening 33', and the opening may be filled with a suitable lubricant for the anti-friction bearings 34 and 35, plates as 39 and 40 being mounted at opposite ends of the opening 33' to retain the lubricant and to keep out grit and dirt.

It has been explained that the ribs 31 on the periphery of the roller R are of spiral configuration and the direction of the lead of the spiral configuration of these ribs is so related to the direction of rotation of the roller R that, as the belt B passes over the ribs 31, what, in effect, is a transverse action transversely across the belt is set up. This, coupled with the resilient nature of the ribs R, is effective to prevent burning or other damage to the belt as B when the edge of a pane of glass P, rested on the rollers S, is engaged with the surface of the belt. Moreover, by locating the roller R in such a position as to cause an appreciable portion of the periphery of the roller R to be engaged with belt B, the abrasive surface of the belt is, in effect, opened which increases the effectiveness of the belt and contributes to a longer life for the belt.

It will be apparent from the foregoing description that the arrangement which we have afforded enables the hereinabove set forth and kindred objects of this invention to be realized. However, while we have illustrated and described the preferred embodiment of our invention, it is to be understood that these are capable of variation and modification, and we therefore do not wish to be limited to the precise details set forth, but desire to avail ourselves of such changes and alterations as fall within the purview of the following claim.

We claim:

Apparatus for use in smoothing the edge of a glass plate by means of an abrasive belt or the like comprising a rotatable platen roller including a solid unyielding core having a continuous periphery and which is adapted to receive the axle of said roller, an endless resilient sleeve attached to the outer surface of the core and having a plurality of individual integral spirally directed ribs on the outer periphery thereof which have a traversing action transversely of and which serve as a yieldable back-up support for, said abrasive belt traveling over an appreciable portion of the periphery of the platen roller, a support for said platen roller including a block in which the axle of the platen roller is mounted, a rod mounted in said block at one end and having a mounting bracket at the other end attached to supporting structure which operatively mounts said abrasive belt, said rod being adjustably mounted in said bracket to permit the relative distance between said roller and the supporting structure for said abrasive belt to be regulated, and means directly connected to said block support for the platen roller affording a support for the glass plate to be smoothed including a plurality of rollers arranged in a row with their axes disposed normal to the axis of said platen roller to firmly support such glass plate while the edge thereof that is to be smoothed is reciprocated smoothly and evenly across the abrasive face of that part of the abrasive belt traversing said peripheral portion of the platen roller during a smoothing operation, said rollers being disposed adjacent to said platen roller with the upper portions thereof disposed in a common plane so related to said platen roller as to support said glass plate substantially in the horizontal center plane of the diameter of said platen roller so as to resist shearing effects of the abrasive belt on the marginal portion of said glass plate adjacent to the edge thereof to be smoothed and thereby mitigate against fractures of said glass plate.

References Cited in the file of this patent

UNITED STATES PATENTS

| Number | Name | Date |
|---|---|---|
| 401,215 | Ross | Apr. 9, 1889 |
| 1,475,742 | Brown | Nov. 27, 1923 |
| 1,483,884 | Hitchcock | Feb. 19, 1924 |
| 1,506,745 | Griffith | Sept. 2, 1924 |
| 1,771,417 | Owen | July 27, 1930 |
| 2,162,279 | Herchenrider | June 13, 1939 |
| 2,332,329 | Maca | Oct. 19, 1943 |
| 2,341,442 | Hulbert et al. | Feb. 8, 1944 |
| 2,401,670 | Spitz | June 4, 1946 |
| 2,431,822 | Murray | Dec. 2, 1947 |
| 2,469,735 | Lindsay et al. | May 10, 1949 |
| 2,527,554 | Kimball | Oct. 31, 1950 |
| 2,578,662 | Bader | Dec. 18, 1951 |
| 2,581,270 | McVey | Jan. 1, 1952 |
| 2,594,646 | Hendrickson | Apr. 29, 1952 |
| 2,603,917 | Myers | July 22, 1952 |
| 2,621,449 | Martin et al. | Dec. 16, 1952 |
| 2,624,158 | Hendrickson | Jan. 6, 1953 |
| 2,639,560 | Cosmos | May 26, 1953 |